(12) United States Patent
Kikuchi et al.

(10) Patent No.: US 8,193,451 B2
(45) Date of Patent: Jun. 5, 2012

(54) POLYAMIDE-IMIDE RESIN INSULATING VARNISH AND INSULATED WIRE USING THE SAME

(75) Inventors: Hideyuki Kikuchi, Hitachi (JP); Yuzo Yukimori, Hitachi (JP); Yuki Honda, Hitachi (JP)

(73) Assignees: Hitachi Magnet Wire Corp., Ibaraki (JP); Hitachi Cable, Ltd., Tokyo (JP)

( * ) Notice: Subject to any disclaimer, the term of this patent is extended or adjusted under 35 U.S.C. 154(b) by 141 days.

(21) Appl. No.: 12/478,344

(22) Filed: Jun. 4, 2009

(65) Prior Publication Data

US 2009/0301753 A1    Dec. 10, 2009

(30) Foreign Application Priority Data

Jun. 4, 2008  (JP) .................................. 2008-146699

(51) Int. Cl.
 *H01B 7/00* (2006.01)
(52) U.S. Cl. .............................. 174/110 R; 174/110 SR
(58) Field of Classification Search ..................... 174/36, 174/110 R, 110 SR, 113 R, 120 R, 12, 125.1, 174/126.1, 126.2; 428/458, 401, 404, 626, 428/627, 423.1
See application file for complete search history.

(56) References Cited

U.S. PATENT DOCUMENTS

| | | | | |
|---|---|---|---|---|
| 4,451,306 A | * | 5/1984 | Verne | 156/51 |
| 4,477,624 A | * | 10/1984 | Waki | 524/736 |
| 4,985,313 A | * | 1/1991 | Penneck et al. | 428/627 |
| 5,209,987 A | * | 5/1993 | Penneck et al. | 428/610 |
| 5,393,612 A | * | 2/1995 | Matsuura et al. | 428/458 |
| 6,811,875 B2 | | 11/2004 | Kikuchi et al. | |
| 2002/0123571 A1 | * | 9/2002 | Reynolds et al. | 525/178 |
| 2006/0240255 A1 | * | 10/2006 | Kikuchi et al. | 428/375 |
| 2009/0202831 A1 | * | 8/2009 | Honda et al. | 428/383 |

FOREIGN PATENT DOCUMENTS

| | | |
|---|---|---|
| JP | 05-174632 | 7/1993 |
| JP | 2897186 | 3/1999 |
| JP | 2004-137370 A | 5/2004 |
| JP | 2004-204187 | 7/2004 |
| JP | 2006-302835 | 11/2006 |
| WO | WO 2006/115124 A1 | 11/2006 |

OTHER PUBLICATIONS

U. S Office Action dated Jun. 24, 2009 from related U.S. Appl. No. 12/213,257.
U.S. Office Action dated Dec. 29, 2009 from related U.S. Appl. No. 12/213,257.
Japanese Office Action dated Nov. 30, 2009 (mailed Dec. 8, 2009) together with English language translation from counterpart Japanese patent application 2008-2055 of related U.S. Appl. No. 12/213,257.

* cited by examiner

*Primary Examiner* — William H Mayo, III
(74) *Attorney, Agent, or Firm* — Scully, Scott, Murphy & Presser, P.C.

(57) ABSTRACT

A polyamide-imide resin insulating varnish includes an aromatic diamine component, an aromatic diisocyanate component, an acid component including an aromatic tricarboxylic acid anhydride, and a solvent. The aromatic diamine component includes an aromatic diamine with three or more benzene rings and an aromatic diamine with two or less benzene rings. The aromatic diamine with three or more benzene rings and the aromatic diamine with two or less benzene rings are added 99/1 to 30/70 in mole ratio.

8 Claims, 1 Drawing Sheet

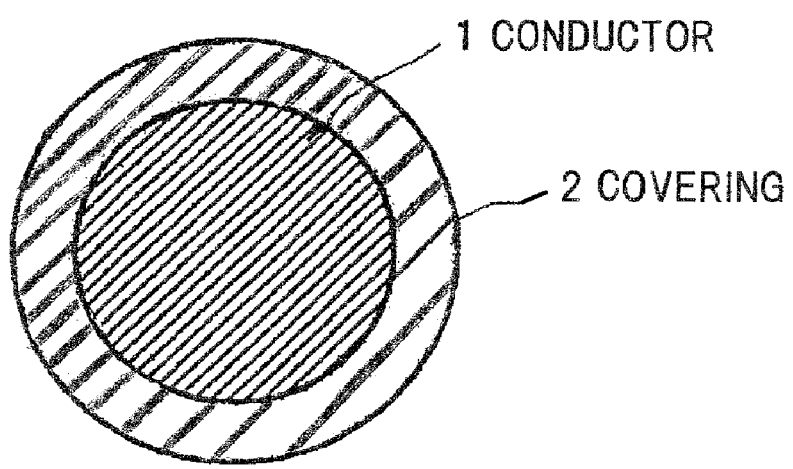

POLYAMIDE-IMIDE RESIN INSULATING VARNISH AND INSULATED WIRE USING THE SAME

The present application is based on Japanese patent application No. 2008-146699 filed on Jun. 4, 2008, the entire contents of which are incorporated herein by reference.

BACKGROUND OF THE INVENTION

1. Field of the Invention

This invention relates to a polyamide-imide resin insulating varnish and, in particular, to a polyamide-imide resin insulating varnish for providing a covering with a high partial discharge inception voltage, as well as an insulated wire using the polyamide-imide resin insulating varnish.

2. Description of the Related Art

In recent years, hybrid vehicles begin to spread on the background of energy savings. A motor used therefor is inverter-driven so that downsizing, lightening, high heat resistance and high-voltage driving thereof have been accelerated.

As an enameled wire used for a motor coil, a polyamide-imide enameled wire is essential which has all of the excellent heat resistance, mechanical performance endurable in severe coil shaping, and transmission oil resistance, so as to meet the motor performance requirements for downsizing, lightening, high heat resistance. Here, the insulation retention property of the transmission oil resistance may be affected by type or amount of oil additives. However, except for the affection of the oil additives, the transmission oil resistance can be directly affected by the hydrolysis resistance due to water included.

A polyamide-imide resin insulating varnish used for a covering of a polyamide-imide enameled wire is a heat resistant polymer resin that exhibits excellent properties such as heat resistance, mechanical performance, hydrolysis resistance etc. It is generally produced such that two components of 4,4'-diphenylmethanediisocyanate (MDI) and trimellitic anhydride (TMA) are mainly reacted by decarboxylation reaction to be nearly equal in proportion of amide group and imide group in a polar solvent such as N-methyl-2-pryrrolidone (NMP), N,N-dimethylformamide (DMF), N,N-dimethylacetamide (DMAC), dimethylimidazolidinone (DMI) etc.

As production methods for polyamide-imide resin insulating varnish, isocyanate method, acid chloride method etc. are known. The isocyanate method is generally used in view of its productivity. For polyamide-imide resin, it is well known to use the synthesis reaction of two components, 4,4'-diphenylmethanediisocyanate (MDI) and trimellitic anhydride (TMA) as an acid component.

Also, a polyamide-imide resin may be synthesized such that BAPP and TMA are first reacted under acid excess in proportion of 50/100 to 80/100 so as to improve the polyamide-imide resin property, and MDI is then used to produce the polyamide-imide resin (see JP-B-2897186).

On the other hand, according as the motor is driven at higher voltage, due to superposition of inverter surge, a risk of partial discharge increases so that it becomes difficult to address the inverter surge insulation. One of the drawbacks of the covering of polyamide-imide resin insulating varnish is its high permittivity, and the existence of amide group and imide group can be most intimately related to an increase in permittivity in aspect of the resin structure. As compared to the other enamel resin insulating varnish such as polyester and polyesterimide, the polyamide-imide resin insulating varnish is high in permittivity and low in partial discharge inception voltage while it is significantly excellent in heat resistance, mechanical performance, hydrolysis resistance, oil resistance. Meanwhile, polyimide resin insulating varnish is high in heat resistance, but low in abrasion resistance and hydrolysis resistance. Further, it is inferior to the polyamide-imide in mechanical performance such as coil shaping workability and transmission oil resistance.

In insulated wires, especially, enameled wires used for a motor coil, since the motor is frequently inverter driven for high efficiency, many cases occur where partial discharge is caused by excessive voltage (i.e., inverter surge) and results in insulation breakdown. Recently, according as the motor drive voltage increases, the risk of partial discharge increases further.

Thus, if the polyamide-imide resin insulating varnish could have a low permittivity, an enameled wire excellent in partial discharge resistance can be realized such that it can address the high voltage driving of the motor.

As a technique for enhancing the voltage application life against the partial discharge, a partial discharge resistant enameled wire is disclosed that is produced by coating a partial discharge resistant resin varnish, in which organosilica sol is dispersed in a resin solution, on a conductor (e.g., JP-A-2006-302835 and JP-B-2897186).

In such a partial discharge resistant resin varnish with the organosilica sol dispersed in the resin solution, the solubility between the organosilica sol and the resin solution can contribute to enhancement in partial discharge resistance, and it is proved that the solubility between the organosilica sol and the resin solution composed of polyamide-imide resin varnish etc. can be enhanced by copolymerizing several monomers therewith (see JP-B-3496636).

Another technique is known that electrical field between wires (electrical field applied to air layer existing between the wires) is reduced to prevent the partial discharge to improve the voltage application life.

The above technique includes to reduce the electric field by providing conductivity or semi-conductivity with the surface of the enameled wire, and to electric field by lowering the permittivity of the insulated film.

In the technique of providing conductivity or semi-conductivity with the surface of the enameled wire, the film may be scratched upon the coil shaping to lower the insulation characteristic and its end portion is needed to be insulated. Thus, this technique has many problems and is therefore not good in utility.

On the other hand, in the technique of lowering the permittivity of the insulated film, negative effects are typically caused by the lowered permittivity on the heat resistance and mechanical performance since the lowered permittivity depends on the resin structure. Thus, it is difficult for the above techniques to make a substantial improvement.

The polyamide-imide resin insulating varnish produced by the method of JP-A-2004-204187 is problematic since it is low in softening resistant temperature when it is used as a covering of an enameled wire.

In other words, if the softening resistant temperature is low, the short-circuit risk may increase when it is subjected to high temperature caused by the instantaneous overload of the motor.

SUMMARY OF THE INVENTION

It is an object of the invention to provide a polyamide-imide resin insulating varnish that allows reduction in permittivity while retaining its heat resistance, mechanical performance, oil resistance etc. for producing a covering with a high partial discharge inception voltage as well as to provide an insulated wire using the polyamide-imide resin insulating varnish.

(1) According to one embodiment of the invention, a polyamide-imide resin insulating varnish comprises:

an aromatic diamine component;
an aromatic diisocyanate component;
an acid component including an aromatic tricarboxylic acid anhydride; and
a solvent,
wherein said aromatic diamine component comprises an aromatic diamine with three or more benzene rings and an aromatic diamine with two or less benzene rings.

In the above embodiment (1), the following modifications, changes and a combination thereof can be made.

(i) The aromatic diamine with three or more benzene rings and the aromatic diamine with two or less benzene rings are added 99/1 to 30/70 in mole ratio.

(ii) The aromatic diamine with three or more benzene rings comprises at least one selected from 2,2-bis[4-(4-aminophenoxy)phenyl]propane, bis[4-(4-aminophenoxy)phenyl]sulfone, bis[4-(4-aminophenoxy)phenyl]ether, fluorenediamine, 4,4'-bis(4-aminophenoxy)biphenyl, 1,4-bis(4-aminophenoxy) benzene, and isomers thereof.

(iii) The aromatic diamine with two or less benzene rings comprises at least one selected from 4,4'-diaminodiphenylether, 4,4'-diaminodiphenylsulfone, 4,4'-diaminodiphenylmethane, 1,2-diaminobenzene, 1,3-diaminobenzene, 1,4-diaminobenzene and isomers thereof.

(iv) The acid component further comprises an aromatic tetracarboxylic acid dianhydride.

(2) According to another embodiment of the invention, an insulated wire comprises:

the polyamide-imide resin insulating varnish as defined in the above embodiment (1),
wherein the varnish is coated on a conductor or on an other insulating film formed on the conductor, baked to form a covering thereof.

In the above embodiment (2), the following modifications, changes and a combination thereof can be made.

(v) The covering comprises a specific permittivity of not more than 3.5.

Points of the Invention

As monomers for the polyamide-imide resin insulating varnish, aromatic diamine components composed of an aromatic diamine with three or more benzene rings and an aromatic diamine with two or less benzene rings are used in order to reduce the permittivity by lowering the ratio of the amide group and the imide group, which can be most intimately related to an increase in permittivity, included in the polymer. Thereby, the polyamide-imide resin insulating varnish with excellent heat resistance etc. can be obtained.

BRIEF DESCRIPTION OF THE DRAWINGS

The preferred embodiments according to the invention will be explained below referring to the drawings, wherein:

FIG. 1 is a schematic cross sectional view showing an insulated wire coated with a polyamide-imide resin insulating varnish in a preferred embodiment according to the invention.

DETAILED DESCRIPTION OF THE PREFERRED EMBODIMENTS

A polyamide-imide resin insulating varnish in the preferred embodiments of the invention will be described below.

The polyamide-imide resin insulating varnish is produced such that a aromatic diamine component and an acid component of an aromatic tricarboxylic acid anhydride are reacted under excess acid to produce an aromatic imide prepolymer with carboxylic acids at both ends by imidization based on the dehydration ring-closure reaction of the acid anhydride and the amine, the prepolymer is cooled, and an aromatic diisocyanate component is added to have a decarboxylation reaction of the dicarboxylic acid and the diisocyanate to produce an amide linkage. As monomers for the polyamide-imide resin insulating varnish, aromatic diamine components composed of an aromatic diamine with three or more benzene rings and an aromatic diamine with two or less benzene rings are used in order to reduce the permittivity by lowering the ratio of the amide group and the imide group, which can be most intimately related to an increase in permittivity, included in the polymer. Thereby, the polyamide-imide resin insulating varnish with excellent heat resistance etc. can be obtained.

The polyamide-imide resin insulating varnish of the invention uses, as a main solvent, a polar solvent such as NMP (N-methyl-2-pyrrolidone) to have the solution polymerization.

Other than NMP as a main solvent, a solvent not inhibiting the synthesis reaction of polyamide-imide resin may be used together for synthesis or dilution which includes γ-butyrolactone, N,N-dimethylacetamide (DMAC), N,N-dimethylformamide (DMF), dimethylimidazolidinone (DMI), cyclohexanone, methylcyclohexanone etc. However, if it may lower the solubility of the polyamide-imide resin, it is necessary to consider its use.

As the aromatic diamine components, an aromatic diamine with three or more benzene rings and an aromatic diamine with two or less benzene rings are used together.

The aromatic diamine with three or more benzene rings may include at least one selected from 2,2-bis[4-(4-aminophenoxy)phenyl]propane (BAPP), bis[4-(4-aminophenoxy)phenyl]sulfone (BAPP), bis[4-(4-aminophenoxy)phenyl]ether (BAPE), fluorenediamine (FDA), 4,4'-bis(4-aminophenoxy)biphenyl, 1,4-bis (4-aminophenoxy) benzene, and isomers thereof.

The aromatic diamine with two or less benzene rings may include at least one selected from 4,4'-diaminodiphenylether (DPE), 4,4'-diaminodiphenylsulfone (DDS), 4,4'-diaminodiphenylmetahne (DAM), 1,2-diaminobenzene, 1,3-diaminobenzene, 1,4-diaminobenzene and isomers thereof.

An aromatic diamine including a halogen element may be used together with the above aromatic diamines if necessary. Optionally, an alicyclic diamine, a silane based diamine may be used together therewith.

The diisocyanates can be generally and industrially produced by using phosgene on the basis of diamines, and all or a part of the above-mentioned diamines may be used in place of the diisocyanates. When all of them are replaced by the diisocyanates, the synthesis can be completed by one-step decarboxylation reaction without using the two-step synthesis where MDI used at the second step of the synthesis as mentioned earlier is mixed together with the diisocyanates. When a part of them is replaced by the diisocyanates, the synthesis can be completed by being mixed with MDI used at the second step of the synthesis as mentioned earlier.

The aromatic diisocyanate components may include an aromatic diisocyanate such as 4,4'-diphenylmethanediisocyanate (MDI), 2,2'-bis[4-(4-isocyanatephenoxy)phenyl]propane (BIPP), tolylene diisocyanate (TDI), naphthalene diisocyanate, xylylene diisocyanate, biphenyl diisocyanate, diphenylsulfone diisocyanate, and diphenylether diisocyanate, and isomers and multimers thereof. If necessary, aliphatic diisocyanates such as hexamethylene diisocyanate, isophorone diisocyanate, dicyclohexylmethane diisocyanate, and xylene diisocyanate, or alicyclic diisocyanates by hydrogenation of the above-mentioned aromatic diisocyanates, and isomers thereof may be used or used together.

The acid component may include trimellitic anhydride (TMA) as a tricarboxylic acid anhydride. Aromatic tricarboxylic acid anhydrides such as benzophenone tricarboxylic acid anhydride may be also used but TMA is most suitable.

Tetracarboxylic acid dianhydrides may be used together with TMA. The tetracarboxylic acid dianhydrides may include pyromellitic acid dianhydride (PMDA), 3,3',4,4'-benzophenone tetracarboxylic acid dianhydride (BTDA), 3,3',4,4'-diphenylsulfone tetracarboxylic acid dianhydride (DSDA), 4,4'-oxydiphthalic acid dianhydride (ODPA), 3,3',4,4'-biphenyl tetracarboxylic acid dianhydride. If necessary, butane tetracarboxylic acid dianhydride, 5-(2,5-dioxotetrahydro-3-furanyl)-3-methyl-3-cyclohexene-1,2-dicarboxylic acid anhydride, or alicyclic tetracarboxylic acid dianhydride by hydrogenation of the above-mentioned aromatic tetracarboxylic acid dianhydrides may be used together.

The alicyclic structure compounds may be used together if necessary since they are expected to enhance the reduction in permittivity or to enhance the transparency of the resin compound, but may cause a reduction in heat resistance and therefore it is necessary to consider the compounding ratio and chemical structure.

The compounding ratio of the aromatic diamine with three or more benzene rings and the aromatic diamine with two or less benzene rings is suitably in the range of (aromatic diamine with three or more benzene rings)/(aromatic diamine with two or less benzene rings)=99/1 to 30/70 (mole ratio). It is more suitably in the range of (aromatic diamine with three or more benzene rings)/(aromatic diamine with two or less benzene rings)=70/30 to 40/60 (mole ratio). If the compounding ratio of the aromatic diamine with three or more benzene rings becomes more than 99 (mole ratio), the reduction effect of permittivity increases but the softening resistant temperature may lower. On the other hand, if the compounding ratio of the aromatic diamine with two or less benzene rings becomes more than 70 (mole ratio), the softening resistant temperature may be improved but the permittivity may increase and the solubility may lower at the first step imidization reaction. Therefore, these ratios are undesirable.

The ratio of the aromatic diamine component using together the aromatic diamine with three or more benzene rings and the aromatic diamine with two or less benzene rings and TMA is not specifically limited. However, the compounding ratio of all diamine components, i.e., the aromatic diamine with three or more benzene rings, the aromatic diamine with two or less benzene rings used at the first step synthesis and the other diamine used according to need, and the compounding ration of all acid components, i.e., TMA and the other tetracarboxylic acid dianhydride used according to need are most preferably determined such that the amine and the anhydride are substantially in equal ratio as required for the imidization reaction. If out of this ratio, the amino group etc. which causes a side reaction at the second step synthesis may remain and result in deterioration in the performance of the polyamide-imide resin insulating varnish. Therefore, it is necessary to consider these ratios.

In the typical polyamide-imide resin insulating varnish using MDI and TMA, MDI and TMA is synthesized in equal ratio but the isocyanate component may be excessively added in the range of 1 to 1.05. The compounding ratio of MDI at the second step synthesis in the present invention is not specifically limited but the imide dicarboxylic acid synthesized at the first step and the total amount of the diisocyanates are desirably in equal ratio. Meanwhile, as in the first step, the diisocyanates may be added a little excessively.

The specific permittivity is suitably as low as possible, and is desirably not more than 3.5 so as to effect the inverter surge insulation (i.e., partial discharge resistance).

In the synthesis of the polyamide-imide resin insulating varnish, a reaction catalyst such as amine, imidazole and imidazoline may be used but it is desirable that it does not inhibit the stability of the varnish. A terminator such as alcohol may be used at the termination of the synthesis reaction.

EXAMPLES

Examples 1 to 7 and Comparative Examples 2 to 3 demonstrate the synthesis of polyamide-imide resin insulating varnish using the diamine components (aromatic diamine components) and are implemented in the following two stages.

A flask with an agitator, a circulatory condenser tube, a nitrogen inflow tube and a thermometer is provided. As the first step synthesis reaction, the diamine component, the acid component and about 50 to 80% of the solvent as used in Examples 1 to 7 and Comparative Examples 2 to 3, respectively, are put therein. It is heated to 180° C. for about one hour while being agitated in nitrogen atmosphere and is reacted four hours at this temperature while running off water generated by the dehydration reaction outside the system. After it is cooled to 60° C. while being in the nitrogen atmosphere, the diisocyanate component and the remaining solvent are put therein. As the first step synthesis reaction, it is heated to 140° C. for about one hour while being agitated in nitrogen atmosphere and is reacted two hours at this temperature to have polyamide-imide resin solution with a reduced viscosity of about 0.5 dl/g.

Comparative Example 1 demonstrates the typical synthesis of a polyamide-imide resin insulating varnish using only the diisocyanate components and is implemented as follows.

Into the flask with an agitator, a circulatory condenser tube, a nitrogen inflow tube and a thermometer, the materials and the solvents as used in Comparative Example 1 are put. It is heated to 140° C. for about one hour while being agitated in nitrogen atmosphere and is reacted two hours at this temperature to have polyamide-imide resin solution with a reduced viscosity of about 0.5 dl/g.

The polyamide-imide resin insulating varnish thus obtained is coated and baked on a copper conductor with a diameter of 0.8 mm to have an enameled wire with a film thickness of 45 μm.

FIG. 1 shows an enameled wire with the polyamide-imide resin insulating varnish of the invention coated thereon.

The polyamide-imide resin insulating varnish is coated and baked on a conductor 1 to have a insulating covering 2 formed outside the conductor 1.

In modification, the other insulating covering may be formed directly on the conductor 1, and the covering 2 of the polyamide-imide resin insulating varnish of the invention may be formed thereon. Here, the other insulating covering is specifically limited if it does not inhibit the partial discharge resistance or its general properties.

Table 1 shows the properties of Examples and Comparative Examples and the properties of the enameled wires obtained.

TABLE 1

| | | | Ex 1 | Ex 2 | Ex 3 | Ex 4 | Ex 5 | Ex 6 |
|---|---|---|---|---|---|---|---|---|
| Polyamide-imide resin varnish composition | Diamine component | BAPP (Mw = 410) | 184.5 (0.45) | 143.5 (0.35) | 102.5 (0.25) | 61.5 (0.15) | 102.5 (0.25) | |
| | | 4,4'-DPE (Mw = 200) | 10.0 (0.05) | 30.0 (0.15) | 50.0 (0.25) | 70.0 (0.35) | 30.0 (0.15) | 30.0 (0.15) |
| | | 3,4'-DPE (Mw = 200) | | | | | 20.0 (0.10) | 20.0 (0.10) |
| | | DDS (Mw = 248) | | | | | | |
| | | BAPP/DPE ratio | 90/10 | 70/30 | 50/50 | 30/70 | 50/50 | 50/50 *1 |
| | Diisocyanate component | 4,4'-MDI (Mw = 250) | 127.5 (0.51) | 127.5 (0.51) | 127.5 (0.51) | 127.5 (0.51) | 127.5 (0.51) | 127.5 (0.51) |
| | | BIPP (Mw = 462) | | | | | | 115.5 (0.25) |
| | | 2,4-TDI (Mw = 174) | | | | | | |
| | Tricarboxylic acid anhydride | TMA (Mw = 192) | 192.0 (1.00) | 192.0 (1.00) | 192.0 (1.00) | 192.0 (1.00) | 192.0 (1.00) | 192.0 (1.00) |
| | Tetracarboxylic acid dianhydride | PMDA (Mw = 218) | | | | | | |
| | Solvent | NMP | 1500 | 1450 | 1400 | 1350 | 1400 | 1000 |
| | | γ-butyrolactone | | | | | | 450 |
| | | DMF | | | | | | |
| Properties of polyimide-amide resin varnish | | Appearance | brown | brown | brown | brown | brown | brown |
| | | Reduced viscosity (dl/g) | 0.50 | 0.50 | 0.50 | 0.50 | 0.50 | 0.50 |
| | | Nonvolatile content (mass %) | 25.4 | 25.2 | 25.1 | 24.9 | 25.1 | 24.7 |
| Properties of polyimide-amide enameled wire | Dimensions (mm) | Conductor diameter | 0.800 | 0.800 | 0.800 | 0.800 | 0.800 | 0.800 |
| | | covering thickness | 0.045 | 0.046 | 0.045 | 0.045 | 0.046 | 0.045 |
| | | Finished outer diameter | 0.890 | 0.891 | 0.890 | 0.890 | 0.891 | 0.890 |
| | Flexibility | Self-diameter winding | passed | passed | passed | passed | passed | passed |
| | Abrasion resistance | Number of reciprocating abrasion (times) | 365 | 402 | 416 | 436 | 408 | 428 |
| | Heat resistance (280° C., 168 hrs) | Insulation breakdown residual percentage (%) | 74.4 | 76.6 | 78.8 | 79.0 | 77.0 | 78.5 |
| | Hydrolysis resistance (water: 0.1 vol %, 140° C., 1000 hrs) | Insulation breakdown residual percentage (%) | 82.6 | 85.1 | 85.3 | 85.5 | 85.0 | 87.0 |
| | Softening resistant temp (° C.) | Elevated temperature test | 390 | 418 | 426 | 438 | 422 | 429 |
| | Specific permittivity (1 KHz) | Dry state 100° C. bath | 3.39 | 3.48 | 3.46 | 3.49 | 3.45 | 3.46 |
| | | Moisture state 25° C.-50% RH | 3.81 | 3.82 | 3.84 | 3.87 | 3.84 | 3.86 |
| | Partial discharge inception voltage (25° C.-50% RH) | Vp (50 Hz, 10 pC) | 926 | 932 | 921 | 917 | 928 | 918 |

| | | | Ex 7 | Comp Ex 1 | Comp Ex 2 | Comp Ex 3 |
|---|---|---|---|---|---|---|
| Polyamide-imide resin varnish composition | Diamine component | BAPP (Mw = 410) | 102.5 (0.25) | | 205.0 (0.50) | 41.0 (0.10) |
| | | 4,4'-DPE (Mw = 200) | 50.0 (0.25) | | | 80.0 (0.40) |
| | | 3,4'-DPE (Mw = 200) | | | | |
| | | DDS (Mw = 248) | 6.2 (0.03) | | | |
| | | BAPP/DPE ratio | 50/50 | | 100/0 | 20/80 |
| | Diisocyanate component | 4,4'-MDI (Mw = 250) | 95.5 (0.38) | 255.0 (1.02) | 127.5 (0.51) | 127.5 (0.51) |
| | | BIPP (Mw = 462) | | | | |
| | | 2,4-TDI (Mw = 174) | 17.7 (0.10) | | | |
| | Tricarboxylic acid anhydride | TMA (Mw = 192) | 182.4 (0.95) | 192.0 (1.00) | 192.0 (1.00) | 192.0 (1.00) |
| | Tetracarboxylic acid dianhydride | PMDA (Mw = 218) | 10.9 (0.05) | | | |
| | Solvent | NMP | 1400 | 1000 | 1550 | 1300 |
| | | γ-butyrolactone | | | | |
| | | DMF | | 300 | | |
| Properties of polyimide-amide resin varnish | | Appearance | brown | brown | brown | precipitated |
| | | Reduced viscosity (dl/g) | 0.50 | 0.50 | 0.50 | — |
| | | Nonvolatile content (mass %) | 24.8 | 25.5 | 25.2 | — |

TABLE 1-continued

| Properties of polyimide-amide enameled wire | Dimensions (mm) | Conductor diameter | 0.800 | 0.800 | 0.800 | — |
| --- | --- | --- | --- | --- | --- | --- |
| | | covering thickness | 0.046 | 0.046 | 0.046 | — |
| | | Finished outer diameter | 0.891 | 0.891 | 0.890 | — |
| | Flexibility | Self-diameter winding | passed | passed | passed | — |
| | Abrasion resistance | Number of reciprocating abrasion (times) | 410 | 466 | 305 | — |
| | Heat resistance (280° C., 168 hrs) | Insulation breakdown residual percentage (%) | 75.8 | 78.2 | 70.3 | — |
| | Hydrolysis resistance (water: 0.1 vol %, 140° C., 1000 hrs) | Insulation breakdown residual percentage (%) | 85.3 | 88.3 | 80.5 | — |
| | Softening resistant temp (° C.) | Elevated temperature test | 434 | 435 | 359 | — |
| | Specific permittivity (1 KHz) | Dry state 100° C. bath | 3.49 | 4.06 | 3.35 | — |
| | | Moisture state 25° C.-50% RH | 3.88 | 4.48 | 3.80 | — |
| | Partial discharge inception voltage (25° C.-50% RH) | Vp (50 Hz, 10 pC) | 922 | 839 | 928 | — |

Notes:
Ex: Example, Comp Ex: Comparative Example, (*1): BIPP is converted into BAPP As shown in Table 1, of the properties of the enameled wires, the dimensions, flexibility, abrasion resistance, heat resistance and softening resistant temperature are measured according to JIS C 3003.

The hydrolysis resistance is measured such that 0.4 mL of water and a twisted pairs enameled wire are put in the a heat resistant glass tube with an inner volume of 400 mL, the tube is sealed by fusing with a burner etc., the sealed sample is treated in a constant-temperature bath at 140° C. for 1000 hours, and the sample is then taken out of the tube to measure the insulation breakdown voltage thereof, whereby a residual percentage of the insulation breakdown voltage of the treated sample to that of the untreated sample is calculated.

The specific permittivity is measured such that a metal electrode is deposited on the surface of an enameled wire, and an electrostatic capacitance is measured between the conductor and the metal electrode, whereby the specific permittivity is calculated based on the relationship between the electrode length and covering thickness. The electrostatic capacitance is measured by using an impedance analyzer at 1 kHz. A permittivity in dry state is measured in a constant-temperature bath at 100° C., and a permittivity in moisture absorption state (moisture state) is measured in a constant-temperature and humidity bath at 25° C.-50% RH after being left therein for 50 hours.

The partial discharge inception voltage is measured such that the sample is left in a constant-temperature and humidity bath at 25° C.-50% RH for 50 hours, and the discharge inception voltage is then measured at 50 Hz and with a detection sensitivity of 10 pC.

Example 1

As the first step synthesis reaction, 184.5 g (0.45 moles) of BAPP, 10.0 g (0.05 moles) of 4,4'-DPE, 192.0 g (1.0 mole) of TMA, and 1000 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 500 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 2

As the first step synthesis reaction, 143.0 g (0.35 moles) of BAPP, 30.0 g (0.15 moles) of 4,4'-DPE, 192.0 g (1.0 mole) of TMA, and 1000 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 450 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 3

As the first step synthesis reaction, 102.5 g (0.25 moles) of BAPP, 50.0 g (0.25 moles) of 4,4'-DPE, 192.0 g (1.0 mole) of TMA, and 1000 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 400 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 4

As the first step synthesis reaction, 61.5 g (0.15 moles) of BAPP, 70.0 g (0.35 moles) of 4,4'-DPE, 192.0 g (1.0 mole) of TMA, and 1000 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 350 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 5

As the first step synthesis reaction, 102.5 g (0.25 moles) of BAPP, 30.0 g (0.15 moles) of 4,4'-DPE, 20.0 g (0.10 moles) of 3,4'-DPE, 192.0 g (1.0 mole) of TMA, and 1000 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 400 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 6

As the first step synthesis reaction, 30.0 g (0.15 moles) of 4,4'-DPE, 20.0 g (0.10 moles) of 3,4'-DPE, 96.0 g (0.5 moles) of TMA, and 450 g of γ-butyrolactone and 500 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI and 115.5 g (0.25 moles) of BIPP (2,2'-bis[4-(4-isocyanatephenoxy)phenyl]propane) as the aromatic diisocyanate component, 96.0 g (0.5 moles) of TMA, and 450 g of NMP as a solvent are put therein, it is reacted at 140° C. whereby polyamide-imide resin insulating varnish is obtained which has a reduced viscosity of about 0.5 dl/g and a resin content concentration of about 25% by weight.

Example 7

As the first step synthesis reaction, 102.5 g (0.25 moles) of BAPP, 50.0 g (0.25 moles) of 4,4'-DPE, 6.2 g (0.03 moles) of 4,4'-DDS, 182.4 g (0.95 moles) of TMA, 10.9 g (0.05 moles) of PMDA, and 1000 g of NMP as a solvent are put therein, it is reacted at 180° C. while running off water outside the system, and it is cooled to 60° C. while being in the nitrogen atmosphere. Then, as the second step synthesis reaction, 95.6 g (0.38 moles) of MDI and 17.7 g (0.10 moles) of TDI as the aromatic diisocyanate component, and 400 g of NMP as a solvent are put therein, it is reacted at 140° C. whereby polyamide-imide resin insulating varnish is obtained which has a reduced viscosity of about 0.5 dl/g and a resin content concentration of about 25% by weight.

Comparative Example 1

255.0 g (1.02 moles) of MDI as the aromatic diisocyanate component, 192.0 g (1.0 mole) of TMA as the aromatic tricarboxylic acid anhydride and 1300 g of NMP as a solvent are put therein, it is reacted at 140° C. whereby polyamide-imide resin insulating varnish is obtained which has a reduced viscosity of about 0.5 dl/g and a resin content concentration of about 25% by weight.

Comparative Example 2

As the first step synthesis reaction, 205.0 g (0.50 moles) of BAPP, 192.0 g (1.0 mole) of TMA, and 1100 g of NMP as a solvent are put therein, it is reacted at 180° C. while running off water outside the system, and it is cooled to 60° C. while being in the nitrogen atmosphere. Then, as the second step synthesis reaction, 127.5 g (0.505 moles) of MDI as the aromatic diisocyanate component and 450 g of NMP as a solvent are put therein, it is reacted at 140° C. whereby polyamide-imide resin insulating varnish is obtained which has a reduced viscosity of about 0.5 dl/g and a resin content concentration of about 25% by weight.

Comparative Example 3

As the first step synthesis reaction, 41.0 g (0.10 moles) of BAPP, 80.0 g (0.40 moles) of 4,4'-DPE, 192.0 g (1.0 mole) of TMA, and 1000 g of NMP as a solvent are put therein, it is reacted at 180° C. while running off water outside the system, but a precipitation occurs such that subsequent measurements of enameled wire cannot be implemented.

As shown in Table 1, in the enameled wires using the polyamide-imide resin insulating varnish in Examples 1 to 7, it is proved that they have a low permittivity whereby the partial discharge inception voltage is improved by about 70 to 100 V as compared to the conventional one. The general properties thereof are good and equivalent to that of the conventional one.

By contrast, Comparative Example 1 demonstrating a polyamide-imide enameled wire in wide use is good in abrasion resistance, heat resistance, and hydrolysis resistance, but low in specific permittivity and low in partial discharge inception voltage.

Comparative Example 2 without the aromatic diamine with two or less benzene rings is about 360° C. in softening temperature which is lower than the enameled wires with a covering of polyamide-imide resin insulating varnish in wide use.

Comparative Example 3 with the aromatic diamine with two or less benzene rings at the compounding ratio of more than 70 (mole ratio) deteriorates in solubility such that a precipitation occurs at the first step synthesis reaction.

Although the invention has been described with respect to the specific embodiments for complete and clear disclosure, the appended claims are not to be thus limited. In particular, it should be noted that all of the combinations of features as described in the embodiment and Examples are not always needed to solve the problem of the invention.

What is claimed is:

1. A polyamide-imide resin insulating varnish, comprising:
    an aromatic diamine component;
    an aromatic diisocyanate component;
    an acid component including an aromatic tricarboxylic acid anhydride; and
    a solvent,
    wherein said aromatic diamine component comprises an aromatic diamine with three or more benzene rings and an aromatic diamine with two or less benzene rings that are added at a proportion of 90/10 to 50/50 in mole ratio.

2. The polyamide-imide resin insulating varnish according to claim 1, wherein the aromatic diamine with three or more benzene rings and the aromatic diamine with two or less benzene rings are added 99/1 to 30/70 in mole ratio.

3. The polyamide-imide resin insulating varnish according to claim 1, wherein the aromatic diamine with three or more benzene rings comprises at least one selected from 2,2-bis[4-(4-aminophenoxy)phenyl]propane, bis[4-(4-aminophenoxy)phenyl]sulfone, bis[4-(4-aminophenoxy)phenyl]ether, fluorenediamine, 4,4'-bis(4-aminophenoxy) biphenyl, 1,4-bis(4-aminophenoxy)benzene, and isomers thereof.

4. The polyamide-imide resin insulating varnish according to claim 1, wherein the aromatic diamine with two or less benzene rings comprises at least one selected from 4,4'-diaminodiphenylether, 4,4'-diaminodiphenylsulfone, 4,4'-diaminodiphenylmetahne, 1,2-diaminobenzene, 1,3-diaminobenzene, 1,4-diaminobenzene and isomers thereof.

5. The polyamide-imide resin insulating varnish according to claim 1, wherein the acid component further comprises an aromatic tetracarboxylic acid dianhydride.

6. An insulated wire, comprising:
the polyamide-imide resin insulating varnish as defined in claim 1,
wherein the varnish is coated on a conductor or on an other insulating film formed on the conductor, baked to form a covering thereof.

7. The insulated wire according to claim 5, wherein the insulated wire has a softening resistant temperature of greater than 380° C. and a partial discharge inception voltage of greater than 900 Vp at 25° C. and -50% relative humidity.

8. The polyamide-imide resin insulating varnish according to claim 1, wherein the varnish has a softening resistant temperature of greater than 380° C. and a partial discharge inception voltage of greater than 900 Vp at 25° C. and -50% relative humidity.

* * * * *